United States Patent
Shen

[11] Patent Number: 5,425,526
[45] Date of Patent: Jun. 20, 1995

[54] TELESCOPIC TUBE MOUNTING DEVICE

[76] Inventor: Wei H. Shen, 6F, No. 416, Sec. 4, Jen Ai Rd., Taipei, Taiwan, Prov. of China

[21] Appl. No.: 247,770
[22] Filed: May 23, 1994
[51] Int. Cl.⁶ ............................................... F16M 3/00
[52] U.S. Cl. ..................................... 248/636; 248/562; 248/631; 267/132; 362/413
[58] Field of Search .............. 248/636, 562, 618, 655, 248/669, 676, 132, 188.5, 161, 162.1, 147, 157, 176, 602, 631; 267/127, 64.11; 362/413, 418

[56] References Cited

U.S. PATENT DOCUMENTS

| | | | |
|---|---|---|---|
| 4,079,978 | 3/1978 | McMullin | 248/188.5 X |
| 4,500,075 | 2/1985 | Tsuchiya et al. | 267/314 X |
| 4,896,866 | 1/1990 | Legrand et al. | 267/127 X |

Primary Examiner—Ramon O. Ramirez
Attorney, Agent, or Firm—Browdy and Neimark

[57] ABSTRACT

A telescopic tube mounting device, which includes an outer tube having a coupling at the top, an inner tube made to slide in and out of the outer tube and locked at the desired elevation by a lock screw on the coupling, a C-shaped locating ring fastened to the bottom end of the inner tube to prohibit disconnection of the inner tube from the coupling, a stopper sealed in the bottom end of the inner tube and having a longitudinal through hole with a tapered top orifice for passing air in and out of the inner tube to buffer the falling speed of the inner tube when the inner tube is collapsed.

2 Claims, 5 Drawing Sheets

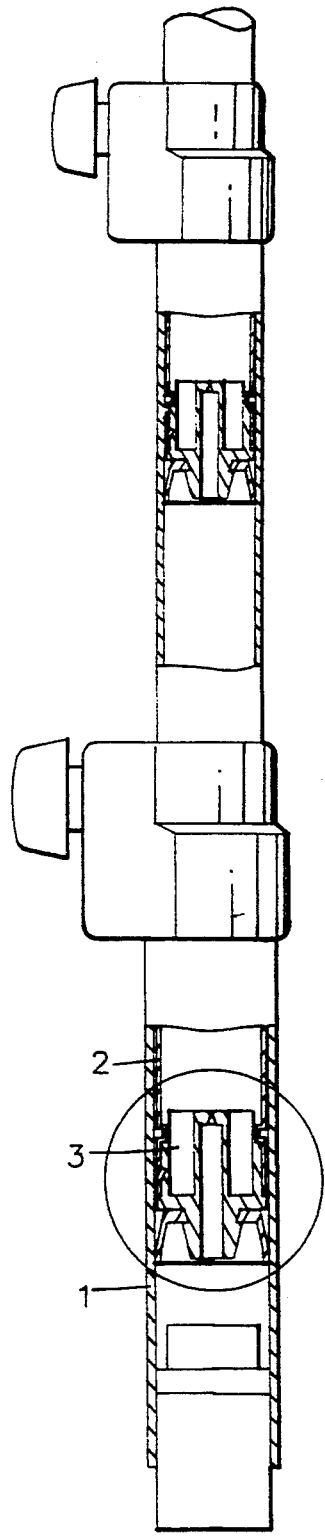
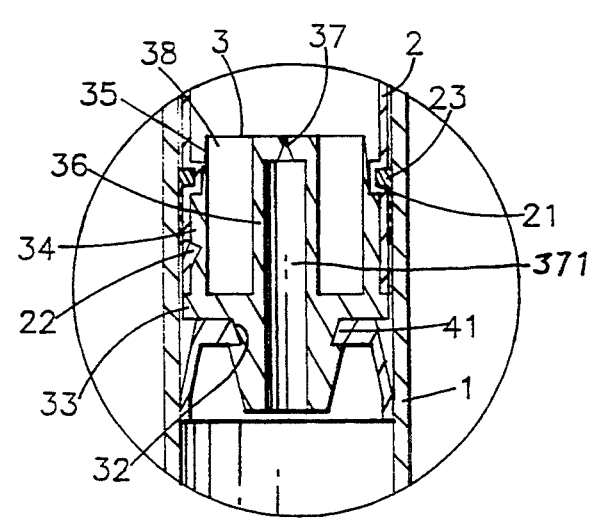
FIG.3
FIG.4

5,425,526

TELESCOPIC TUBE MOUNTING DEVICE

BACKGROUND OF THE INVENTION

The present invention relates to a telescopic tube mounting device which prohibits the inner tubes from falling at a rush.

In studios, a variety of lighting fixtures and reflectors are necessary. These lighting fixtures and reflectors are commonly supported on telescopic stands so that the vertical as well as horizontal positions of the lighting fixtures and reflectors can be conveniently adjusted. FIG. 1 shows a telescopic tube mounting device for a telescopic stand according to the prior art wherein the inner tube has a bottom end sealed by a stopper, which has an air hole for passing air in and out, and a rubber cone fastened to the stopper by a clamp and disposed on the outside and stopped against the inside wall of the outer tube. When the inner tube is collapsed, air is allowed to pass through the air hole on the stopper at a low flow rate, and therefore the falling speed of the inner tube is slowed down. The installation of this telescopic tube mounting device is complicated because the inner tube must be processed through a ramming process to keep the stopper fixed in place.

SUMMARY OF THE INVENTION

It is one object of the present invention to provide a telescopic tube mounting device which is inexpensive to manufacture. It is another object of the present invention to provide a telescopic tube mounting device which prohibits the inner tubes from falling at a rush when collapsed.

According to one aspect of the present invention, the telescopic tube mounting device comprises an outer tube having a coupling at the top, an inner tube made to slide in and out of the outer tube and locked at the desired elevation by a lock screw on the coupling, a stopper sealed in the bottom end of the inner tube and having a longitudinal through hole with a tapered top orifice for passing air in and out of the inner tube to buffer the falling speed of the inner tube when the inner tube is collapsed.

According to another aspect of the present invention, the coupling has a packing ring on the inside, which fits into the outer tube at the top and has an outward flange stopped above the outer tube; a C-shaped locating ring is fixed to the bottom end of the inner tube on the outside, which will stop against the packing ring of the coupling to prohibit disconnection of the inner tube from the coupling when the inner tube is pulled out of the outer tube.

BRIEF DESCRIPTION OF THE DRAWINGS

FIG. 3 is a longitudinal view in section of the telescopic tube mounting device shown in FIG. 2;

FIG. 4 is a partial view taken on FIG. 3 and shown in an enlarged scale;

DETAILED DESCRIPTION OF THE PREFERRED EMBODIMENT

Figure 1:
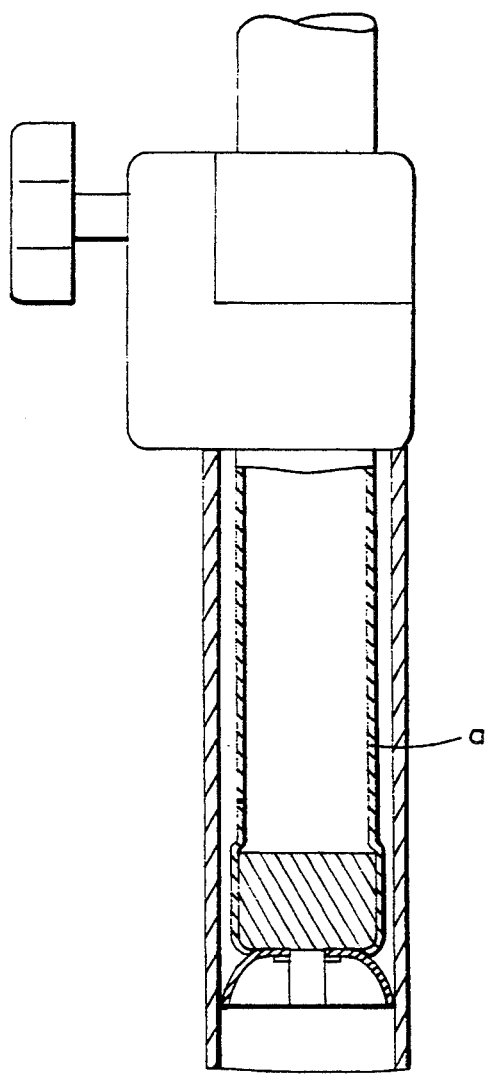
FIG. 1 shows a telescopic tube mounting device according to the prior art.
Figure 2:
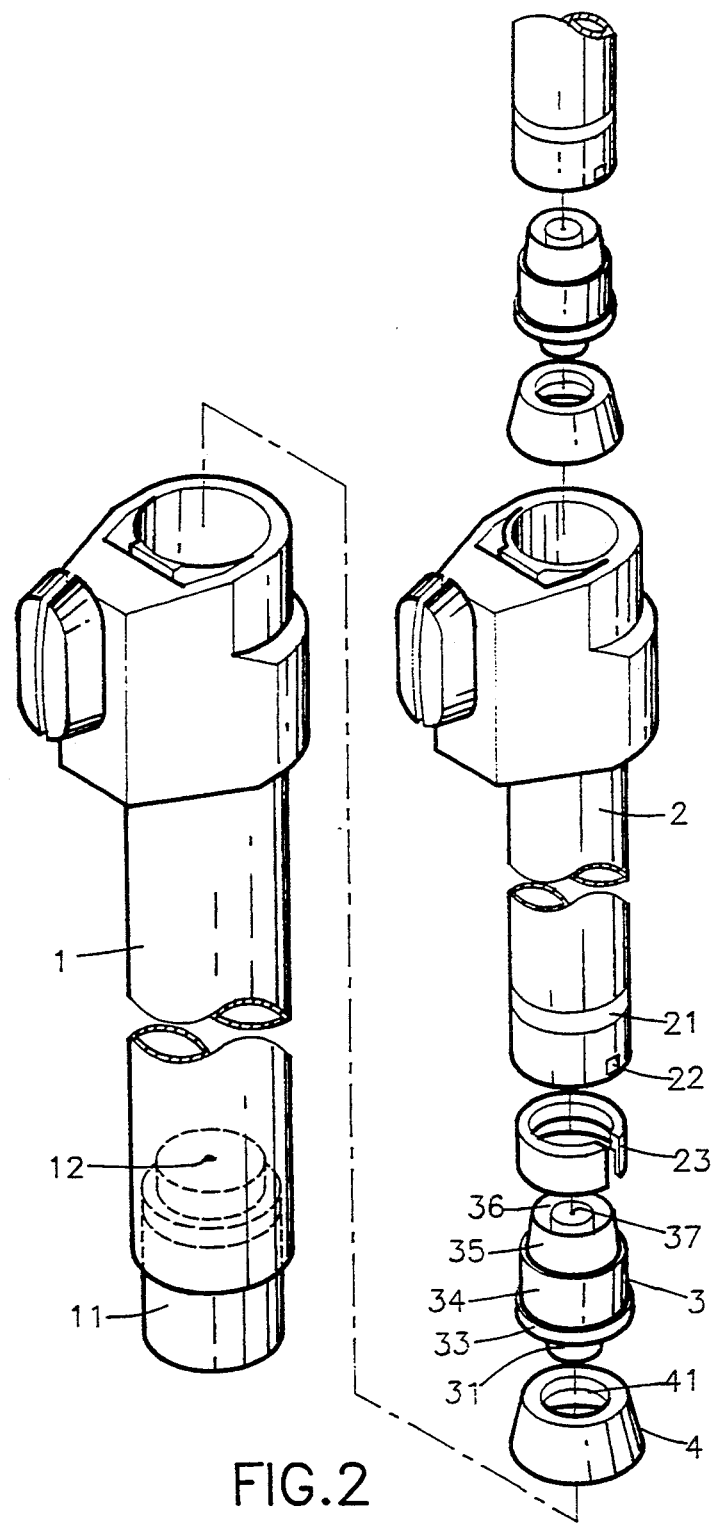
FIG. 2 an exploded view of a telescopic tube mounting device according to the present invention.
Figure 5:
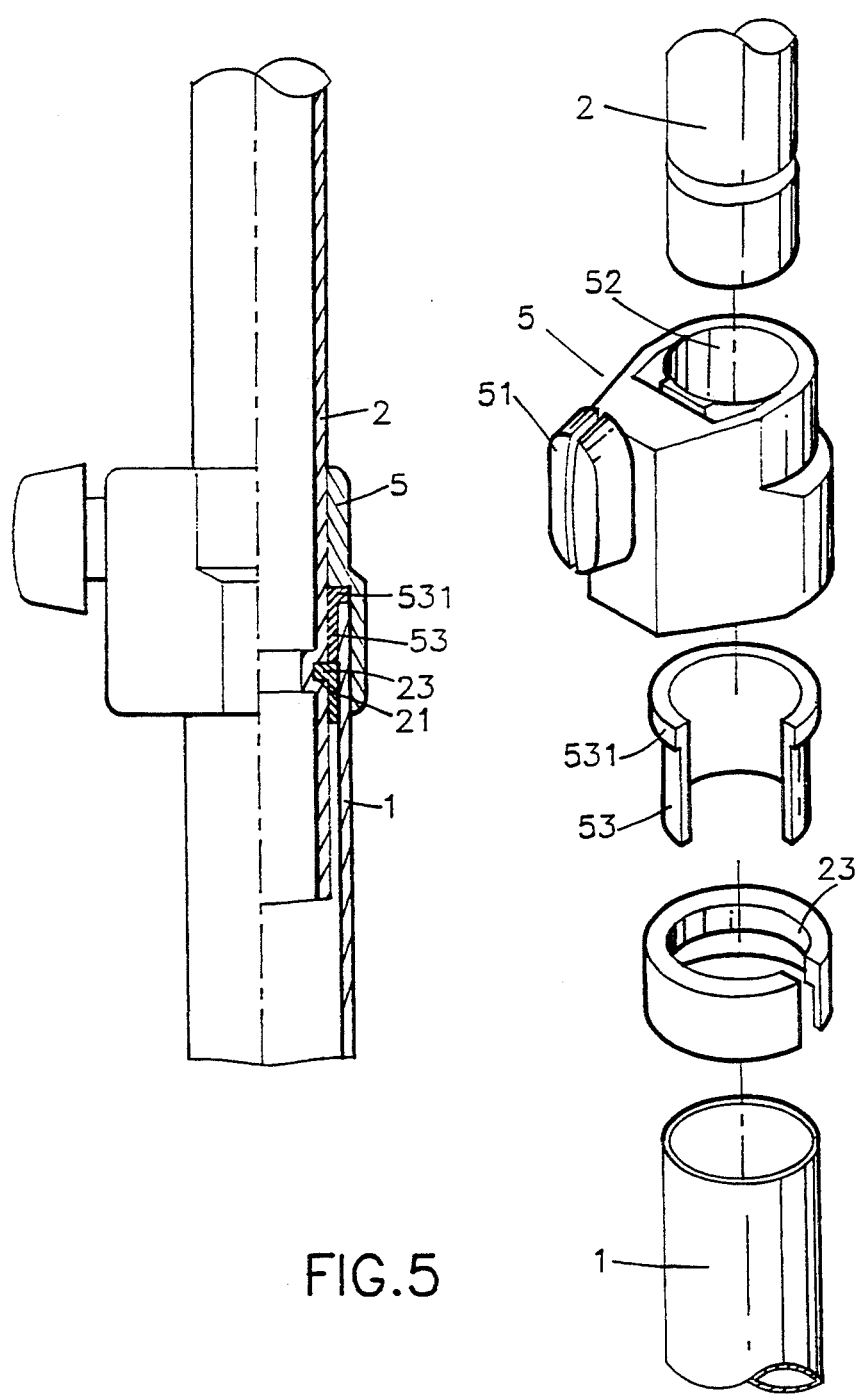
FIG. 5 is an exploded view of the coupling for the telescopic tube mounting device shown in FIG. 2.

Referring to FIGS. 2 through 5, a telescopic tube mounting device in accordance with the present invention is generally comprised of an outer tube 1, an inner tube 2 made to slide in and out of the outer tube 1, a rubber stopper 3, a rubber cone 4, and a coupling 5.

The outer tube 1 has a bottom end fixed with a plug 11. The plug 11 has an air hole 12 through the longitudinal axis. The inner tube 2 has an annular groove 21 around the periphery near the bottom end. A C-shaped locating ring 23 is mounted around the annular groove 21. The rubber stopper 3 comprises a hollow stopper body 34, a bottom tube 31 and a tapered top tube 35 respectively longitudinally extended from two opposite ends of the stopper body 34, an annular flange 33 disposed around the periphery of the stopper body 34 adjacent to the bottom tube 31, an annular groove 32 disposed around the periphery of the bottom tube 31 at the top adjacent to the annular flange 33, a hollow rod 36 disposed within the hollow stopper body 34 and the tapered top tube 35 and having a longitudinal hole 371, which terminates in a tapered orifice 37 at the top made gradually smaller toward the outside, and an air chamber 38 defined within the hollow stopper body 34 and the tapered top tube 35 around the hollow rod 36. The rubber cone 4 is mounted on the annular groove 32 around the bottom tube 31, having a center through hole 41 longitudinally aligned with the bore of the bottom tube 31 and the longitudinal hole 371 of the hollow rod 36. The coupling 5 comprises a stepped center through hole 52, an inside annular flange (not shown) raised from the peripheral wall of the center through hole 52, a lock screw 51 threaded into a radial screw hole (not shown) thereof from the outside, and a packing ring 53 received inside the coupling 5 at the bottom. The packing ring 53 has an outward flange 531 around the top edge thereof stopped at a step (not shown) inside the coupling 5.

The assembly process of the telescopic tube mounting device is outlined hereinafter. The bottom end of the inner tube 2 is inserted through the stepped center hole 52 of the coupling 5 and the packing ring 53, then the C-shaped locating ring 23 is mounted on the annular groove 21 around the bottom end of the inner tube 2, and then the rubber stopper 3 is fitted into the bottom end of the inner tube 2. When the rubber stopper 3 is fitted into the bottom end of the inner tube 2, the bottom end of the inner tube 2 is punched to form a dent 22, causing the rubber stopper 3 firmly retained in position. Then, the rubber cone 4 is mounted on the annular groove 32 around the bottom tube 31 of the rubber stopper 3, and then the outer tube 1 is inserted into the coupling 5 from the bottom and stopped against the outward flange 531 of the packing ring 53 permitting the packing ring 53 to be received inside the outer tube 1. When the lock screw 51 is fastened tight, the inner tube 2 is fixed in position.

Figure 6:
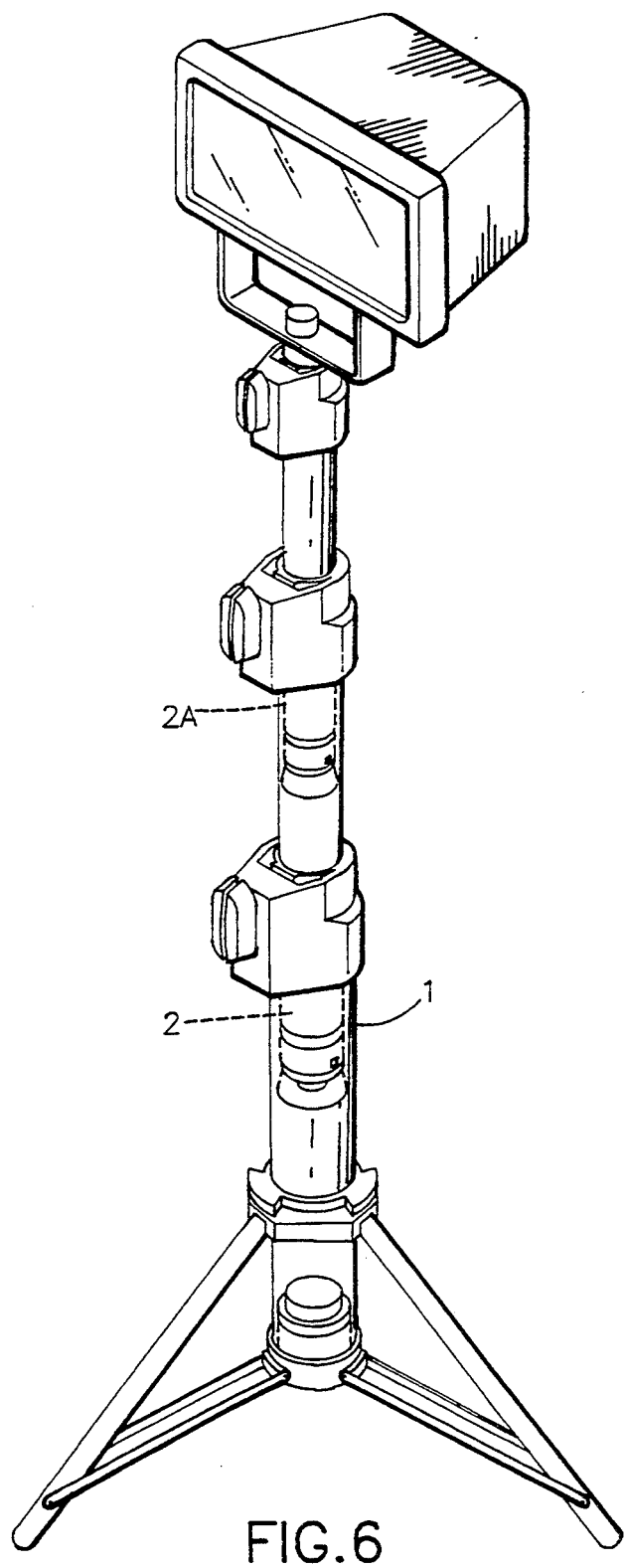
FIG. 6 is an applied view of the present invention.

Referring to FIG. 6, therein shown a lighting fixture mounted on a telescopic stand according to the present invention. The telescopic stand comprises an outer tube 1 and a plurality of inner tubes 2 and 2A that slide one inside another. The inner tubes 2 and 2A are similar in structure. When the lock screw 51 of the coupling 5 of the inner tube 2A is loosened, the weight of the lighting fixture forces the inner tube 2A to move downwards causing inside air forced out of the inner tube 2 into the outer tube 1 through the tapered orifice 37 on the hollow top rod 36 of the rubber stopper 3 of the inner tube 2. Because the tapered orifice 37 is made gradually smaller toward the outside, air cannot be quickly driven out of the inner tube 2 into the outer tube 1 and will flow within the air chamber 38 to stop the inner tube 2A from falling at a high speed. When air is forced to pass through the tapered orifice 37 of the longitudinal hole 371, a sound is simultaneously produced. When the inner tube 2 is pulled out of the outer tube 1, the C-shaped locating ring 23 will stop against the packing ring 53 to keep the inner tube 2 connected to the outer tube 1. Therefore, the inner tube 2 does not disconnect from the outer tube 1. By means of controlling the lock screw 51, the inner tube 2 can be fixed at the desired elevation.

In conclusion, the present invention achieves the following advantages.

a) When the lock screw 51 is loosened, air inside the inner tube 2 cannot be quickly drawn into the outer tube 1, and therefore the falling speed of the inner tube 2 is slowed down, b) Each inner tube 2, 2A, etc., is an independent air chamber respectively communicated with one another through the tapered orifice on the hollow top rod of the respective rubber stopper 3, and therefore each inner tube can be respectively buffered to slow down the falling speed when collapsed.

c) Because the rubber stopper 3 fits into the bottom end of the respective inner tube with the annular flange 33 stopped outside the respective inner tube, air can only pass through the tapered orifice 37, and therefore no side leakage of air will occur.

d) The lock screw 51 allows the respective inner tube 2 or 2A to be locked at the desired elevation; the arrangement of the S-shaped locating ring 23 prevents disconnection of the respective inner tubes 2, 2A, etc., from one another or from the outer tube 1.

What is claimed is:

1. A telescopic tube mounting device comprising:

an outer tube having a bottom end fastened with a plug and a top end open, said plug having an air hole for passing of air in and out of said outer tube;

an inner tube having an annular groove around a bottom end thereof inserted into the top end of said outer tube;

a coupling mounted on said outer tube at the top and disposed around said inner tube, said coupling comprising a packing-ring on the inside fitted into said outer tube and disposed around said inner tube, and a lock screw for locking said inner tube at a desired elevation, said packing ring having an outward flange at the top stopped between a step inside said coupling and the top end of said outer tube;

a C-shaped locating ring mounted around the annular groove on said inner tube and received inside said outer tube;

a stopper fastened to said inner tube at the bottom to seal the bottom end of said inner tube, said rubber stopper comprising a hollow stopper body fitted into said inner tube at the bottom, a tapered top tube disposed inside said inner tube, an annular flange stopped outside the bottom end of said inner tube, a bottom tube longitudinally extended from said stopper body and disposed outside said inner tube, a hollow rod disposed within said hollow stopper body and said tapered top tube, and an air chamber defined within said hollow stopper body and said tapered top tube around said hollow rod, said hollow rod having a longitudinal hole for passing air in and out of said inner tube through said bottom tube, said longitudinal hole having a tapered orifice at the top made gradually smaller toward the top, said bottom tube having an annular groove around the periphery thereof; and a rubber cone mounted on the annular groove around said bottom tube of said stopper and having a center through hole communicated with the longitudinal hole of said hollow rod of said stopper through said bottom tube of said stopper.

2. The telescopic tube mounting device of claim 1 wherein when said inner tube is pulled out of said outer tube, said C-shaped locating ring will be stopped from upward movement by said packing ring of said coupling to prohibit disconnection of said inner tube from said outer tube.

* * * * *